(12) United States Patent
Venter (10) Patent No.: US 10,100,918 B2
(45) Date of Patent: Oct. 16, 2018

(54) DEVICE WITH A TORQUE-PROOF FIRST STRUCTURAL COMPONENT AND A SECOND STRUCTURAL COMPONENT THAT IS CONNECTED AT LEAST IN CERTAIN PARTS IN A ROTATABLE MANNER TO THE FIRST STRUCTURAL COMPONENT

(71) Applicant: Rolls-Royce Deutschland Ltd & Co KG, Blankenfelde-Mahlow (DE)

(72) Inventor: Gideon Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 189 days.

(21) Appl. No.: 14/958,363

(22) Filed: Dec. 3, 2015

(65) Prior Publication Data

US 2016/0160993 A1    Jun. 9, 2016

(30) Foreign Application Priority Data

Dec. 4, 2014    (DE) .................... 10 2014 117 841

(51) Int. Cl.
*F16H 57/04*        (2010.01)
*F01D 25/20*        (2006.01)
(Continued)

(52) U.S. Cl.
CPC ......... *F16H 57/0424* (2013.01); *F01D 25/20* (2013.01); *F02C 7/36* (2013.01);
(Continued)

(58) Field of Classification Search
CPC ............. F16H 57/0424; F16H 57/0426; F16H 57/0427; F16H 57/0428; F16H 57/0436;
(Continued)

(56) References Cited

U.S. PATENT DOCUMENTS 4,094,517 A * 6/1978 Aucktor .................. F01D 25/16
                                                    415/173.7
4,596,474 A * 6/1986 Van Roemburg ..... F16C 17/026
                                                    384/100
(Continued)

FOREIGN PATENT DOCUMENTS

DE    112010000875 T5    6/2013
DE    102012209832 B3    9/2013
(Continued)

OTHER PUBLICATIONS

EPO Translation of DE 112010000875 T5, Hippen et al., Jun. 27, 2013. (Year: 2018).*
(Continued)

*Primary Examiner* — Daniel D Yabut
(74) *Attorney, Agent, or Firm* — Shuttleworth & Ingersoll, PLC; Timothy Klima (57) ABSTRACT

A device with a torque-proof first structural component and a second structural component that is connected at least in certain areas in a rotatable manner to the first structural component, wherein hydraulic fluid can be guided to lubrication points via the first structural component and the second structural component. The second structural component is embodied with blade areas which are extending substantially at a defined angle in the radial direction inside the second structural component and between which transmission areas for hydraulic fluid of the second structural component are provided, with their flow cross sections decreasing in the transmission areas in the flow direction of the hydraulic fluid.

13 Claims, 5 Drawing Sheets

(51) Int. Cl.

| | |
|---|---|
| *F02C 7/36* | (2006.01) |
| *F16H 57/02* | (2012.01) |
| *F04D 1/02* | (2006.01) |
| *F04D 29/08* | (2006.01) |
| *F16H 57/025* | (2012.01) |
| *F16H 57/029* | (2012.01) |
| *F02K 3/06* | (2006.01) |

(52) U.S. Cl.
CPC ............... *F02K 3/06* (2013.01); *F04D 1/02* (2013.01); *F04D 29/086* (2013.01); *F16H 57/025* (2013.01); *F16H 57/029* (2013.01); *F16H 57/0427* (2013.01); *F05D 2260/40311* (2013.01); *Y02T 50/671* (2013.01)

(58) Field of Classification Search
CPC ............ F16H 57/0438; F16H 57/0439; F16H 57/025; F16H 57/029; F01D 25/20; F01D 25/183; F01D 25/16; F01D 25/168; F01D 11/02; F01D 11/025; F04D 1/02; F04D 29/086; F16C 33/748; F16C 33/7823; F16C 33/743; F16C 33/745; F16C 33/6677; F16C 33/805; F16C 33/80; F16C 17/026; F16C 2360/24; F16J 15/447; F16J 15/4472
See application file for complete search history.

(56) References Cited

U.S. PATENT DOCUMENTS

| | | | |
|---|---|---|---|
| 5,161,943 A | 11/1992 | Maier et al. | |
| 5,595,697 A | 1/1997 | Wada et al. | |
| 5,872,875 A | 2/1999 | Halloran et al. | |
| 6,921,080 B2 | 6/2005 | Johnen | |
| 2003/0030225 A1* | 2/2003 | Uesugi | F16C 17/026 |
| | | | 277/431 |
| 2010/0175377 A1 | 7/2010 | Hippen et al. | |
| 2011/0164964 A1 | 7/2011 | Pakkala et al. | |
| 2012/0192570 A1 | 8/2012 | McCune et al. | |
| 2013/0241153 A1* | 9/2013 | Garrison | F01D 11/02 |
| | | | 277/350 |
| 2013/0330170 A1 | 12/2013 | Albert | |
| 2014/0161591 A1* | 6/2014 | Venter | F01D 25/20 |
| | | | 415/122.1 |
| 2014/0232071 A1* | 8/2014 | Orlowski | F16J 15/187 |
| | | | 277/418 |
| 2014/0265145 A1 | 9/2014 | Copeland et al. | |
| 2015/0014940 A1* | 1/2015 | Hoehle | F16J 15/441 |
| | | | 277/412 |
| 2015/0184531 A1 | 7/2015 | Baptista | |
| 2016/0160993 A1 | 6/2016 | Venter | |

FOREIGN PATENT DOCUMENTS

| | | |
|---|---|---|
| FR | 2987417 A1 | 8/2013 |
| WO | WO0204846 A1 | 1/2002 |

OTHER PUBLICATIONS

EPO Translation of WO 0204846 A1, Johnen, Jan. 17, 2002. (Year: 2018).*
German Search Report dated Nov. 19, 2015 for related German Application No. 10 2014 117 841.6.
European Search Report dated Apr. 19, 2016 for counterpart European Application No. 15197341.9.
European Search Report dated Apr. 14, 2016 from related European App No. 15197347.6.
German Search Report dated Nov. 19, 2015 from related German App No. 102014117840.8.
Venter—U.S. Appl. No. 14/958,397, filed Dec. 3, 2015.

* cited by examiner

DEVICE WITH A TORQUE-PROOF FIRST STRUCTURAL COMPONENT AND A SECOND STRUCTURAL COMPONENT THAT IS CONNECTED AT LEAST IN CERTAIN PARTS IN A ROTATABLE MANNER TO THE FIRST STRUCTURAL COMPONENT

CROSS-REFERENCE TO RELATED APPLICATIONS

This application claims priority to German Patent Application 102014117841.6 filed Dec. 4, 2014, the entirety of which is incorporated by reference herein.

BACKGROUND OF THE INVENTION

The invention relates to a device with a torque-proof first structural component and a second structural component that is connected at least in certain areas in a rotatable manner to the first structural component according to the kind as it is described herein.

In devices known from practice which are embodied with a torque-proof first structural component and a second structural component that is connected at least in certain areas in a rotatable manner to the first structural component, and in which hydraulic fluid can be guided to lubrication points via the first structural component and the second structural component, a pressure drop usually occurs in the area of an interface between the structural components. Such constructional arrangements for transmission of hydraulic fluid between a torque-proof structural component and a second structural component connected therewith in a rotatable manner are for example necessary in planetary gears through which bearing units and tooth meshings are supplied with lubricating and cooling oil to the necessary degree.

Planetary gears are also used in the area of turbo engines, such as aircraft engines. Usually turbo engines have two or three rotors which rotate at different rotational speeds in the same or in different rotational directions. In so-called directly driven machines, a low-pressure turbine or a compressor device of such a turbo engine is directly connected to a fan, whereby the low-pressure turbine and the fan rotate at the same rotational speed. In the next generation of turbofans that have a high bypass ratio, the direct dependency between the fan velocity and the velocity of the low-pressure turbine is eliminated, so that both the fan and the low-pressure turbine can be operated in optimal operational ranges. In this context, an increase of the fan diameter requires a reduction of the fan's rotational speed, whereas the low-pressure turbine's level of operational efficiency can be enhanced by increasing the rotational speed while at the same time reducing the blade radius. The enhanced level of operational efficiency in turn provides the possibility of embodying the low-pressure turbine with a smaller number of turbine stages, whereby the low-pressure turbine is characterized by a lower self-weight and can be manufactured in a more cost-effective manner.

Currently, the coupling between the low-pressure turbine and the fan via a reducing gear in planetary design represents the most efficient method for transmitting the driving power of the low-pressure turbine and for lowering the turbine's rotational speed with respect to the rotational speed necessary for operating the fan. Here, epicyclic reduction gears, either with a planetary carrier that is fixed relative to the housing or with a planetary carrier that is embodied in a rotatable manner, provide the desired reduction ratio as well as high power density.

In the case of a planetary carrier that is fixed relative to the housing, in order to obtain the required reduction ratio in the area of an epicyclic gear or of a planetary wheel set, a compressor shaft of the low-pressure turbine is connected to a sun gear of an epicyclic gear. The hollow wheel is in turn coupled to a fan shaft that is driving the fan. The reaction moments are introduced into the housing in the area of the static planetary carrier. If the hollow wheel is embodied in a torque-proof manner, it comes to a high initial rotational speed in the area of the sun gear and at the same time to a low initial rotational speed of the planetary carrier.

In contrast to this, when it comes to a fan epicyclic reduction gear with a rotating planetary carrier it is provided that hydraulic fluid is transferred under pressure from a static or torque-proof housing structure into a rotating structure or into a rotating planetary carrier for the purpose of supplying lubrication points in the area of the planetary wheel set with hydraulic fluid. Bearing devices and tooth meshings of the planetary wheel set can then be supplied with lubricating and cooling oil to the same degree as the bearing units of an engine's main drive train.

In particular so-called high-velocity planetary wheel sets have to be respectively supplied with a correspondingly large hydraulic fluid volume flow in order to provide a sufficient degree of lubrication and cooling of the tooth meshings and to be able to dissipate the thermal losses that are occurring during operation to an appropriate degree.

The pressure losses that have already been mentioned in the beginning especially occur to an undesirably high level when high oil volume flows have to be transferred between such structural components. In order to limit the pressure losses, the flow cross sections have to be dimensioned so as to be correspondingly large, which, however, leads to an increase in a structural component's weight and installation space requirements.

In commonly used engine concepts, fan reduction gears are supplied with lubrication and cooling oil via an oil supply line that extends through the engine core gas flow. The conduits that carry hydraulic fluid extend through the guide blades of an engine. The larger the oil volume flows that are to be guided to the fan reduction gear, the larger the cross section of the guide blades has to be embodied, as the conduits that are extending through the guide blades and that carry the hydraulic fluid have to be dimensioned with a correspondingly large size. These dependencies in turn require that the air inlet cross-section of an engine be increased, which in turn results in an increase of an engine's weight and in a raised specific fuel consumption, or which has a negative impact on an engine's level of efficiency.

SUMMARY OF THE INVENTION

Thus, the present invention is based on the objective to provide a device with a torque-proof first structural component and a second structural component that is connected at least in certain areas in a rotatable manner to the first structural component, in which the hydraulic fluid can be transferred between the structural components to the desired degree.

According to the invention, this objective is achieved through a device with features as described herein.

In a device according to the invention that has a torque-proof first structural component and a second structural component that is connected at least in certain areas in a rotatable manner to the first structural component, the hydraulic fluid can be guided to lubrication points via the first structural component and the second structural component.

According to the invention, the second structural component is embodied with blade areas which extend substantially at a defined angle in the radial direction in the second structural component and between which transmission areas for hydraulic fluid of the second structural component are provided, with their flow cross sections decreasing in the transmission areas in the flow direction of the hydraulic fluid. In this manner, hydraulic fluid can be guided on from the transition area of the interface in the direction of the lubrication points by using the rotatory energy of the second structural component, and pressure losses occurring in the area of the device can at least be reduced with little effort.

If the hydraulic fluid is guided through the transmission areas in the radial direction against the rotational direction of the second structural component, the hydraulic fluid is guided through the second structural component from the transition area of the interface in the direction of the lubrication points with a high level of efficiency by using the rotational energy of the second structural component.

A further development of the device according to the invention is embodied with an interface between the structural components which is sealed off against an environment of the structural components through a sealing device and which comprises the transition area that is limited by the areas of the structural components that are overlapping each other in the radial direction and that carry hydraulic fluid during operation, with the transition area being connected to the supply areas for hydraulic fluid of the first structural component as well as to the transmission areas for hydraulic fluid of the second structural component.

If the interface forms the hydraulic-fluid-carrying area of an at least floating hydrodynamic bearing between the structural components, the second structural component is mounted in a rotatable and substantially wear-free manner at the first structural component. In this case, the device is characterized by a long service life and can be operated with low power dissipations, whereby low power dissipations occur during operation of the device.

In one embodiment of the device according to the invention that is characterized by a strong sealing effect, the sealing device is respectively embodied with at least one thread area in the area of a surface of the second structural component or of the first structural component that is facing towards the surface of the first structural component or of the second structural component.

In an advantageous further development of the device according to the invention, in at least one area of the first structural component and/or of the second structural component that is located in proximity to the thread area, at least one recirculation area is provided that leads to the area of the interface and that connects the transition area of the interface to the area of the thread area that is facing away from the transition area. Through the recirculation area, it is avoided in a simple manner that the pressure that is acting on the sealing device which comprises the thread area is reduced and a wear-free high-pressure barrier is present in proximity to the primary oil supply passage of the first structural component via which the transition area of the interface is sealed. Through the recirculation area, it is avoided in a constructionally simple manner that suction of fluid from the environment of the structural components in the direction of the interface occurs, which results from the presence of a pressure difference which is created by a vacuum that is generated as the hydraulic fluid flows through the interface between the interface and the area of the thread area that is facing away from the transition area of the interface, since via the recirculation area hydraulic fluid can be guided from the interface to the area of the thread area that is facing away from the transition area of the interface and subsequently, via the thread area, back to the transition area.

In a further development of the device according to the invention which is constructionally simple and can be manufactured with small effort, the recirculation area is embodied as a channel or as a bore in the first structural component and/or in the second structural component.

As the pitch and the height of the turns of the threads of the thread area increase with growing distance from the interface, the hydraulic fluid is accelerated more strongly due to the thread lead that varies according to the invention and also due to the modified thread depth in the areas of the thread area that are facing away from the transition area, and is recirculated with a higher velocity in the direction of the transition area. At the same time, due to the constructional embodiment of the thread area that varies depending on the distance from the transition area, a higher pressure is present in the areas of the thread area that are close to the transition area of the interface, with the pressure counteracting an inflow of hydraulic fluid from the transition area of the interface into an intermediate space between the thread area of the first structural component or of the second structural component and the corresponding surface of the second structural component or of the first structural component. In this manner, a flow of hydraulic fluid from the transition area in the direction of the environment of the structural components is avoided in an effective and simple manner.

If the transition area of the interface is arranged in the axial extension of the structural components between the thread areas of the sealing device, the transition area is sealed off to the desired degree against the environment of the structural components in an embodiment of the device that is constructed in an appropriate manner.

In an embodiment of the device according to the invention that is characterized by a strong sealing effect, the thread area comprises a multi-start thread.

The area of the first structural component that is limiting the transition area of the interface is arranged inside the area of the second structural component that forms part of the limitation of the transition area of the interface, or the area of the second structural component is arranged inside the area of the first structural component, whereby the device according to the invention can be embodied so as to be adjustable to the respectively present application case in a simple manner.

If the first structural component is supported by means of bolt elements inside slotted holes to avoid twisting, radial deflections of an engine and relative movements are possible within defined limits, for example. If the bolt elements are arranged so as to abut the straight edges of the slotted holes, it is avoided that the first structural component is centered at the side of the bolt instead of the second structural component.

In further advantageous embodiments of the device according to the invention, the hydraulic fluid can be guided into the second structural component radially from the inside to the outside or from the outside to the inside via the first structural component and the interface.

If the device comprises multiple oil supply areas that are arranged in a symmetrically distributed manner over the circumference of the first structural component, the cross sections of the oil supply areas, which have to be guided through the core flow if the device is used in the area of an aircraft engine, can be embodied with a desirably small diameter, whereby a smaller limitation of the flow cross section of the core flow and thus less blockage of the core flow as well as a higher flow velocity of the oil volume flow through the multiple oil supply areas are achieved. The higher flow velocity in turn advantageously leads to an enhanced oil and pressure distribution in the hydraulic fluid volume flow and thus has a positive effect on the bearing properties of the floating hydrodynamic bearing of the second structural component at the first structural component, and also on the sealing effect of the sealing device.

If, at the side of the thread area that is facing away from the interface, a further sealing device is provided that preferably comprises a seal ring, the transition area of the interface is sealed off against the environment not only by a sealing device that provides a robust dynamic sealing function, but also by a static seal.

In the previously described embodiment variants of the device according to the invention, the second structural component is mounted so as to be rotatable via a floating hydrodynamic bearing at the first structural component and thus in an almost wear-free manner without mechanical contact, and/or in addition an area between the structural components that carries hydraulic fluid is sealed off with a high sealing effect, whereby the oil supply is characterized by a low probability of failure and a long service life and requires low maintenance effort.

For this purpose, the transition area of the interface is sealed off against the environment of the structural components by the at least one thread area in a non-contact manner. Since high spin velocities of the second structural component support the principle of operation of the self-centering hydrodynamic oil connection between the two structural components and also increase the sealing effect in the thread area, the device according to the invention is in particular suitable for applications in which high spin velocities occur.

Principally, the embodiment of the device according to the invention is in particular also suitable for transferring hydraulic fluid from an area that is fixated relative to the housing to areas of a planetary carrier that are carrying hydraulic fluid, with the planetary carrier being arranged in a rotatable manner in the housing area or on the housing area in order to be able to supply hydraulic fluid to bearings, tooth meshings and further areas of a planetary gear that require high degrees of lubrication and cooling, as well as to further devices that are acting together with the planetary gear.

The features specified in the patent claims as well as the features specified in the following exemplary embodiments of the device according to the invention are respectively suitable individually or in any combination with each other for further developing the matter according to the invention.

Further advantages and advantageous embodiments of the device according to the invention follow from the patent claims and from the exemplary embodiments that are described in principal in the following by referring to the drawing, wherein, with a view to clarity, the same reference signs are used for structural components with the same design and functionality in the description of the exemplary embodiments.

BRIEF DESCRIPTION OF THE DRAWINGS

Herein.

DETAILED DESCRIPTION OF THE INVENTION

Figure 1:
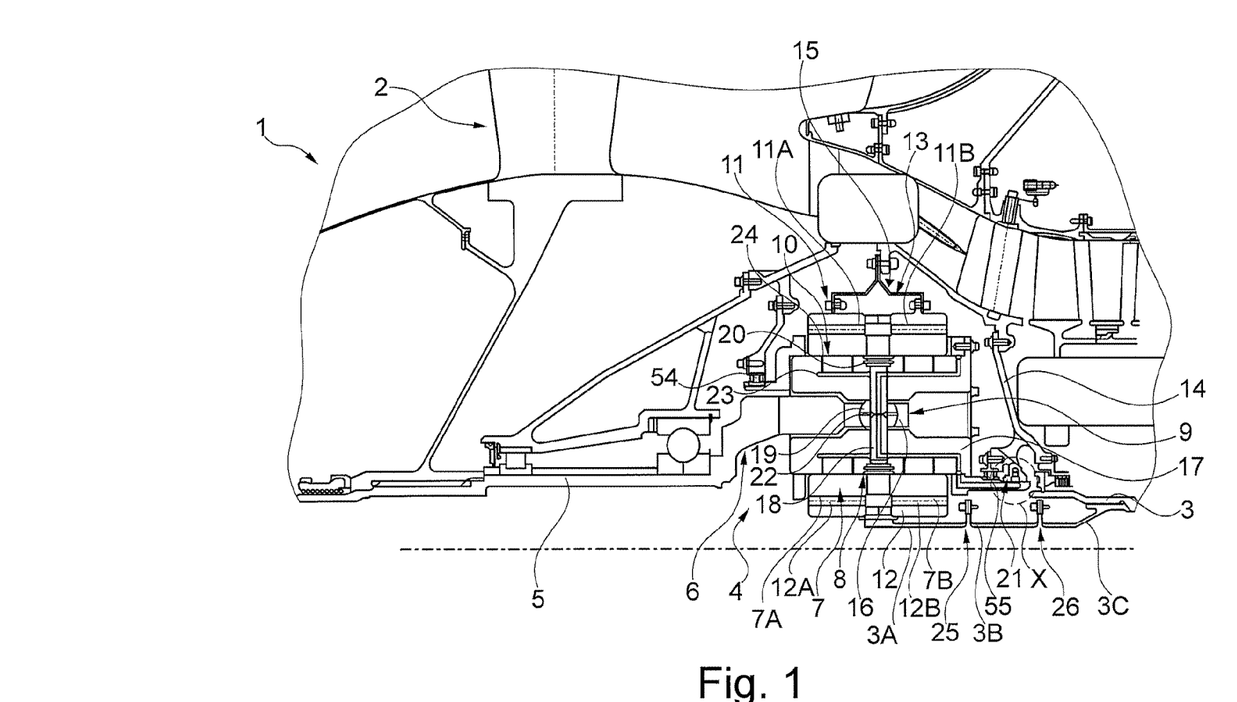
FIG. 1 shows a strongly schematized partial longitudinal section view of an aircraft engine with a device according to the invention.

FIG. 1 shows a partial longitudinal section view of an aircraft engine 1 that shows a front area of the aircraft engine that in the present case is embodied as a gas turbine machine. In a rear area the aircraft engine 1 is embodied with a compressor device that is not shown in any more detail, and in a front area with a fan device. The fan device 2 can be driven by the compressor device, wherein for this purpose the compressor device is connected in the area of a compressor shaft 3 to a fan shaft 5 via an epicyclic gear 4. A planet web 6 of the epicyclic gear 4 is connected to the planetary wheels 7 via bearing devices 8 that are arranged in the planetary wheels 7, which are arranged in a per se known manner so as to be rotatable on the planet web.

The bearing devices 8 respectively comprise one spherical bearing unit 9 for compensating tilting movements between the planetary carrier or the planet web and the planetary wheels 7, and a further bearing unit 10 for rotational decoupling between the planetary carrier 6 and the planetary wheels 7. The planetary carrier 6 is connected to the fan shaft 5 in a torque-proof manner, while a sun gear 12 of the epicyclic gear 4 is operatively connected to the compressor shaft 3 in a torque-proof manner.

Via a flexible connection device 13, a hollow wheel 11 is supported in a torque-proof manner at the side of the housing. In the area of the connection device 13, movements between the hollow wheel 11 and a housing 14 can be at least approximately compensated or counterbalanced in the radial and in the axial direction, whereby tooth meshings in the area between the planetary wheels 7 and the hollow wheel 11 as well as between the planetary wheels 7 and the sun gear 12 are rendered failure-free to the desired degree independently of any movements of the housing that are caused in the area of the housing 14 by acting loads, and whereby the planetary wheels 7 comb with the hollow wheel 11 as well as with the sun gear 12 as loss-free as possible and with low wear.

The flexible connection device 13 comprises an area 15 which is embodied so as to have an at least approximately U-shaped cross section and which facilitates the desired flexible connection of the hollow wheel 11 to the housing 14 in the axial direction as well as in the radial direction of the aircraft engine 1, and which at the same time is embodied with a suitable stiffness in the circumferential direction so as to be able to support to the desired degree the reaction moments that are occurring during operation of the aircraft engine 1 in the area of the epicyclic gear 4 via the hollow wheel 11 in the area of the housing 14.

Through finger-like areas 16, the planetary carrier 6 meshes with the planetary wheels 7, wherein in the present case the planetary carrier 6 is connected through the finger-like areas 16 to the spherical bearing units 9 and via these is also in operative connection with the inner bearing elements 17 that are also arranged radially inside the planetary wheels 7. Via the further bearing units 10 that are arranged between the planetary wheels 7 and the inner bearing elements 17, the inner bearing elements 17 are connected in a rotatable manner to the planetary wheels 7. In addition, in the area of the finger-like areas 16, the planetary carrier 6 is respectively coupled via bolt elements 18 that are arranged so as to extend in the radial direction of the epicyclic gear 4 to the inner bearing elements 17. Here, the bolt elements 18 approximately align with the middle of the planetary wheels 7, respectively, and respectively extend through one coupling element 19 of the spherical bearing units 9 which is arranged in the area of the finger-like areas 16 of the planetary carrier 6 and which is embodied in a spherical manner at least in certain areas, whereby the planet web 6 is also connected to the inner bearing elements 17. In the present case, in the area of the inner bearing elements 17, the bolt elements 18 are additionally secured via spring rings 20 in the radial direction of the epicyclic gear 4 in the area of the inner bearing elements 17, so that an operative connection between the planet web 6 and the inner bearing elements 17 can be ensured across the entire operational range of the aircraft engine 1 as the planetary wheels 7 are rotating. The further bearing units 10 are embodied in the present case as cylindrical roller bearings, in the areas of which radial forces can be transmitted to the desired degree between the planetary wheels 7 and the planet web 6.

The planetary wheels 7 as well as the sun gear 12 and the hollow wheel 11 are respectively embodied with two helically toothed tooth areas 7A and 7B, 11A and 11B, as well as 12A and 12B that are separated from each other and arranged at a distance from each other in the axial direction. For minimizing axial toothing forces, the helix angle of the tooth areas 7A and 7B of the planetary wheels 7, of the tooth areas 11A and 11B of the hollow wheel 11, and of the tooth areas 12A and 12B of the sun gear 12 are embodied in a mirror-inverted manner. This means that the teeth of the tooth areas 7A and 7B, as well as of the tooth areas 11A and 11B, and also of the tooth areas 12A and 12B are respectively arranged in a diagonal manner, wherein the helix angle respectively has the same value, but is embodied so as to be respectively mirror-inverted to the corresponding tooth area of the planetary wheels 7, of the hollow wheel 11 and of the sun gear 12.

In order to be able to supply the toothings in the area of the epicyclic gear 4 with lubricating and cooling oil to the desired degree, hydraulic fluid is introduced—via the device 21 that is arranged in the area X of the aircraft engine 1—respectively in the manner as it is more closely described in connection to FIG. 2 to FIG. 7 from the housing 14 into the inner bearing elements 17, which substantially represent a part of the planetary carrier 6 and rotate together with the planetary carrier 6. Subsequently, the hydraulic fluid is guided on in the radial direction of the epicyclic gear 4 via lubricating and cooling oil lines 22 that are arranged inside the bolt elements 18 from the spherical bearing units 9 into further conduits 23 that are substantially extending in the axial direction. From there, the lubricating and cooling oil is in turn guided on to the further bearing units 10 inside additional conduits 24 that are extending in the radial direction of the inner bearing elements 17. Here, during operation of the aircraft engine 1, the lubricating and cooling oil is also guided on to the desired degree by means of rotating planetary wheels 7 in the direction of the tooth meshings between the planetary wheels 7 and the hollow wheel 11, as well as between the planetary wheels 7 and the sun gear 12.

In the present case, the planetary carrier 6 of the epicyclic gear 4 is mounted in the area of two bearing units 54, 55 between which the epicyclic gear 4 is arranged and in the area of which the loads that are acting at the planetary carrier 6 are introduced into or supported at the housing 14. Since the planetary carrier 6 is embodied with a reduced stiffness in the area of the device 21, the device 21 is provided outside of the area that is located between the bearing units 54, 55, as shown in FIG. 1.

In order to be able to reduce to a minimum the bending moments that are acting in the area of the sun gear 12, in the present case the compressor shaft 3 is embodied so as to be flexible to a defined degree, so that eccentricities that may possibly be present between the compressor shaft 3 and the sun gear 12 can be compensated without creating excessive alignment errors in the area of the spline shaft connection between the compressor shaft 3 and the sun gear 12. In this way, it is provided that the sun gear 12 takes its desired position during operation. For this purpose, the compressor shaft 3 is divided into multiple areas 3A to 3C that are connected to each other via flange areas 25, 26.

Figure 2:
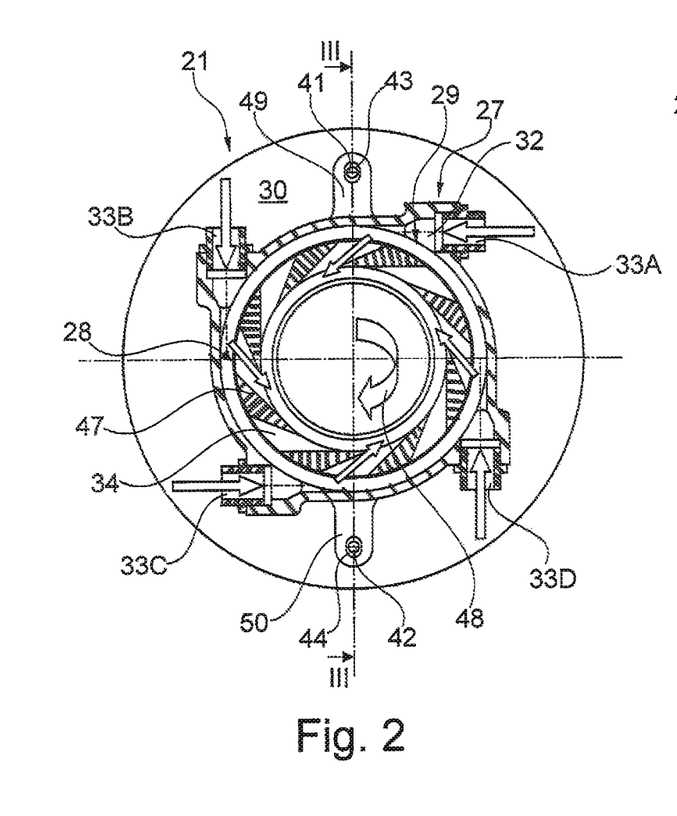
FIG. 2 shows a schematized cross section view of a first embodiment of the device according to the invention.

FIG. 2 shows a cross section view of a first embodiment of the device 21 with a first structural component 27 that is connected in a torque-proof manner to the housing 14 and a second structural component 28 that is connected at least in certain areas in a rotatable manner to the first structural component 27, with the second structural component 28 in turn being connected in a torque-proof manner to the inner bearing elements 17, so that hydraulic fluid can be guided to the lubrication points of the epicyclic gear 4 via the first structural component 27 and the second structural component 28. For this purpose, an interface 29 between the two structural components 27 and 28 is sealed off against an environment 30 or an internal space of the aircraft engine 1 through a sealing device 31 in the manner that will be described in more detail in the following.

The interface 29 comprises a transition area 32 that is limited by the areas of the structural components 27 and 28 that are overlapping in the radial direction, and that carries hydraulic fluid during operation and is connected to the supply areas 33A to 33D of the first structural component 27 as well as to the transmission areas 34 for hydraulic fluid of the second structural component 28. The transition area 32 forms the area of oil or hydraulic fluid conduction of a floating hydrodynamic bearing between the structural components 27 and 28, via which the structural component 28 is mounted in a substantially non-contact and wear-free manner at the structural component 27 that is embodied in a torque-proof manner. In the present case, the supply areas 33A to 33D are embodied as flexible tubes and are arranged so as to be symmetrically distributed around the circumference of the first structural component 27 and of the second structural component 28 in order to create a uniform pressure profile across the circumference of the structural components 27 and 28. This is advantageous, as in this case the second structural component 28 is mounted in the radial direction via a hydrodynamic bearing in the first structural component 27. However, there is substantially no load-bearing hydrodynamic slide bearing in the proper sense in this area. Through the floating bearing of the second structural component, a good sealing effect is achieved without any mechanical contact.

In the area of a surface 36 that is facing towards the surface 35 of the second structural component 28, the sealing device 31 is embodied with thread areas 37, 38 which seal off the transition area 32 against the environment 30 in the axial direction and in doing so provide a robust dynamic sealing function. The sealing function is also present in the event that static sealing devices 39 and 40 fail. The static sealing devices 39 and 40 are provided respectively on the sides or ends of the first structural component 27 or the thread areas 37 and 38 that are facing away from the transition area 32, and represent merely so-called backup-seals if the sealing device 31 is performing its sealing function. Moreover, in the axial direction, the further sealing devices 39 and 40 are supported by disc elements 49 and 50 in grooves 51, 52 of the first structural component 27.

The device 21 creates a floating oil coupling between the first structural component 27 and the second structural component 28 in order to introduce hydraulic fluid to the desired degree from a static or non-rotatable area or the first structural component 27 into a rotating area, i.e. in the present case into the rotatable structural component 28. Here, the first structural component 27 is fixated in a torque-proof manner in the area of the housing 14 through multiple bolt elements 41, 42, wherein the bolt elements 41, 42 are arranged inside slotted holes 43, 44 in order to facilitate housing deflections of the aircraft engine 1 and also relative movements between the housing 14 and the first structural component 27 as well as the second structural component 28. In addition, the bolt elements 41 and 42 are arranged so as to abut the straight edges of the slotted holes 43 and 44 in the circumferential direction of the structural components 27 and 28. In this manner, any bolt-side centering of the static oil supply coupling body or of the first structural component 27 instead of the carrier shaft or the second structural component 28 is avoided.

When it comes to production technical aspects, the radial distances between the static coupling and the rotating areas or between the surfaces 35 and 36 of the structural components 27 and 28 are limited in the present case to an absolute minimum in order to minimize the oil drainage in the direction of the environment 30 in the area between the structural component 28 and the thread areas 37 and 38 of the first structural component 27, to maintain a low dynamic sealing effect in the area of the sealing device 31, and to obtain a desired sealing effect of the sealing device 31. In addition, in spite of the small clearances, the substantially contact-free sealing device 31 is characterized by low wear. The hydrodynamic self-centering that occurs between the structural components 27 and 28 provides a floating static housing which, together with the rotating structural component 28, forms a particularly advantageous wear-free arrangement without any metal-to-metal contact.

Since the hydraulic fluid that flows into the transition area 32 via the supply areas 33A to 33D and from there is drained in the direction of the transmission areas 34 of the second structural component 28 creates a vacuum in the area between the thread areas 37 and 38 and the second structural component 28, and suction of air from the environment 30 in the direction of the transition area 32 via the sealing device 31 is to be avoided, recirculation areas 45, 46 are provided in the areas of the first structural component 27 that are in close proximity to the thread areas 37 and 38 and that lead into the area interface 29, connecting the transition area 32 to the areas of the thread areas 37 and 38 that are facing away from the interface 29. Via the recirculation areas 45 and 46, the hydraulic fluid that is supplied under pressure via the supply areas 33A to 33D partially flows from the interface 29 in the direction of those ends of the thread areas 37 and 38 that are facing away from the interface 29 in the axial direction.

This means that hydraulic fluid flows from the interface 29 via the recirculation areas 45 and 46 into the areas of the first structural component 27 that are arranged between the thread areas 37 and 38 and the further sealing devices 39 and 40. Due to the vacuum caused by the hydraulic fluid flowing through the transition area 32, this hydraulic fluid is then guided from the interface 29 via the recirculation areas 45 and 46 and via the thread areas 37 and 38 back to the transition area 32 in the form of a circulation flow. In this way, suction of air from the environment 30 through the further sealing devices 39 and 40 and the thread areas 37 and 38 is avoided in a constructionally simple manner.

Through the thread areas 37 and 38 as well as the recirculation areas 45 and 46 the pressure acting on the sealing device 31 and also on the further sealing devices 39 and 40 is reduced, and additionally a high-pressure barrier is created in the proximity of the primary oil supply passage or the supply areas 33A to 33D, forming a dynamic seal that provides a strong sealing effect. In this manner, the probability of failure is reduced and the service life of the further sealing devices 39 and 40 comprising the seal rings is prolonged.

Depending on the respectively present application case, the recirculation areas 45 and 46 can be arranged either in the first structural component 27 or in the second structural component 28, wherein that arrangement is selected by means of which the better recirculation pressure can respectively be achieved.

Depending on the respectively present application case, the device 21 is embodied with one or with multiple recirculation areas 45 and 46 that are arranged so as to be distributed over the circumference of the structural components 27 and 28 in order to avoid the previously mentioned suction of air from the environment across the entire circumference of the structural components 27 and 28 in an effective manner.

Via the thread areas 37 and 38, hydraulic fluid is guided through the recirculation areas 45 and 46 in the direction of the transition area 32, and in addition a positive pressure is created in the area of the further sealing devices 39 and 40, whereby the suction of air from the environment 30 via the further sealing devices 39 and 40 and also the thread areas 37 and 38 is avoided with small effort.

Figure 8:
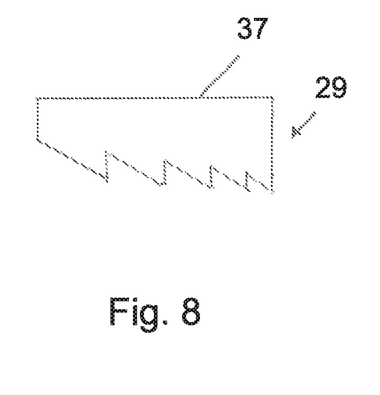
FIG. 8 shows a partial schematic view of the thread area showing a pitch and a height of a turn of a thread of the thread area increasing with growing distance from the interface.
Figure 9:
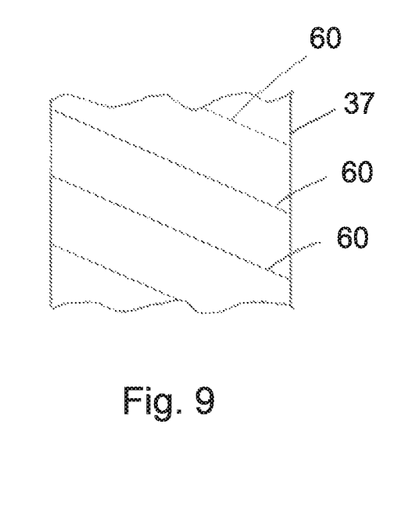
FIG. 9 shows a partial schematic view of the thread area including a multi-start thread.

In the present case, the thread areas 37 and 38 are respectively embodied with single-start threads and can also comprise multi-start threads 60 (see FIG. 9). In any case, in their ends that are facing away from the transition area 32, the thread areas 37 and 38 are embodied with a higher thread lead and with a greater thread depth than in the areas that are facing towards the transition area 32. See FIG. 8. Because the thread lead as well as the thread depth are reduced as the distance to the transition area 32 becomes smaller, the oil is more strongly accelerated in the exterior areas of the thread areas 37 and 38 and is recirculated with a higher velocity in the direction of the transition area 32, while a higher fluid pressure is present in the areas of the thread areas 37 and 38 that are in close proximity to the transition area 32, counteracting an inflow of hydraulic fluid from transition area 32 into the intermediate space between the thread areas 37 and 38 and the second structural component 28. In this way, a flow of hydraulic fluid from the transition area 32 against the flow direction of the hydraulic fluid that is indicated by the arrow 53 is avoided in an effective and simple manner.

The transmission areas 34 of the second structural component 28 are arranged in the manner shown in FIG. 2 between the blade areas 47 that are substantially extending in the radial direction, or they are respectively limited by two blade areas 47. The blade areas 47 are integrated in the second structural component 28 or are connected to the same, and are embodied so as to extend in the rotational direction 48 of the second structural component 28 and so as to be oriented radially outward at an angle with respect to the purely radial extension of the second structural component 28. Due to the angled arrangement of the blade areas 47, the flow cross sections of the transmission area 34 become narrower to the shown extent in the transmission areas 34 from the interface 29 towards the direction of the lubrication points of the epicyclic gear 4 in the flow direction of the hydraulic fluid.

The hydraulic fluid that is supplied under pressure via the supply areas 33A to 33D is introduced against the rotational direction 48 of the second structural component 28 at a high relative speed with respect to the blade areas 47 from the interface 29 or its transition area 32 into the transmission areas 34. The high relative speed between the hydraulic fluid and the blade areas 47, which represents a function of the operating condition of the supply stream, among others, and the reverse rotational direction 48 of the second structural component 28 as well as the angle of attack and the orientation of the blade areas 47 ensure that, in the exemplary embodiment of the device 21 shown in FIG. 2 and FIG. 3, the hydraulic fluid is guided radially inward through the structural component 28 and pressure is applied to it in the transmission areas 34. The number of the blade areas 34 of the second structural component 28 can be selected so as to adjust the torsional behavior of the epicyclic gear 4.

In addition to the previously mentioned advantages that are achieved through the multiple oil supply areas 33A to 33D that are distributed over the circumference of the structural components 27 and 28, the diameters of the supply areas 33A to 33D can be dimensioned so as to be smaller as compared to a lower number of oil supply lines, without thereby limiting the total volume flow. Supply lines with a smaller diameter that are guided in guide blades through the core flow of the aircraft engine 1 restrict the cross section of the core flow to a smaller extent. Furthermore, in the smaller flow cross sections of the oil supply lines, the hydraulic fluid is introduced into the interface 29 with a higher flow velocity, whereby in turn an enhanced oil and pressure distribution is achieved in the volume flow that is introduced into the transmission areas 34 against the rotational direction of the second structural component 28.

By means of this approach and the difference in speed that is occurring here, a desirably high supply pressure is achieved for the supply of the lubrication points downstream of the device 21, wherein an undesired pressure drop in the area of the device 21 is avoided without additional effort thanks to the additive energy that becomes available through the rotation of the second structural component 28. The shape as well as the number of oil supply areas 33A to 33D are designed or defined in such a manner that the hydraulic fluid is transferred with a high level of efficiency in the transmission path of the hydraulic fluid due to the present pressure as well as the flow velocity that is respectively present there. Further, the arrangements of the oil supply areas 33A to 33D and of the blade areas 47 are also coordinated in order to achieve maximal pressure build-up and to be able to guide a maximal oil volume flow through the device 21.

Principally, there is the possibility of manufacturing the structural components 27 and 28 by means of a so-called ALM method (additive layer manufacturing) or by means of a 3D printing method, or the structural components 27 and 28 can be manufactured by means of mechanical manufacturing processes that have the oil supply areas for the corresponding devices, wherein complex integrated oil supply devices can be manufactured by means of ALM processes.

Figure 3:
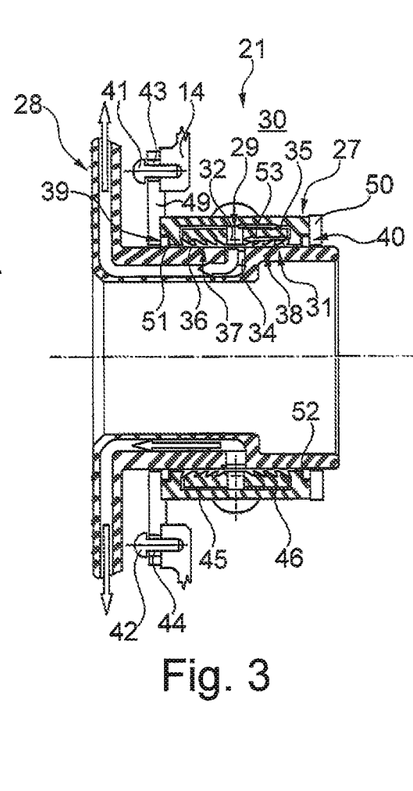
FIG. 3 shows a longitudinal section view of the device according to FIG. 2 along a sectional plane III-III that is more closely characterized in FIG. 2.
Figure 4:
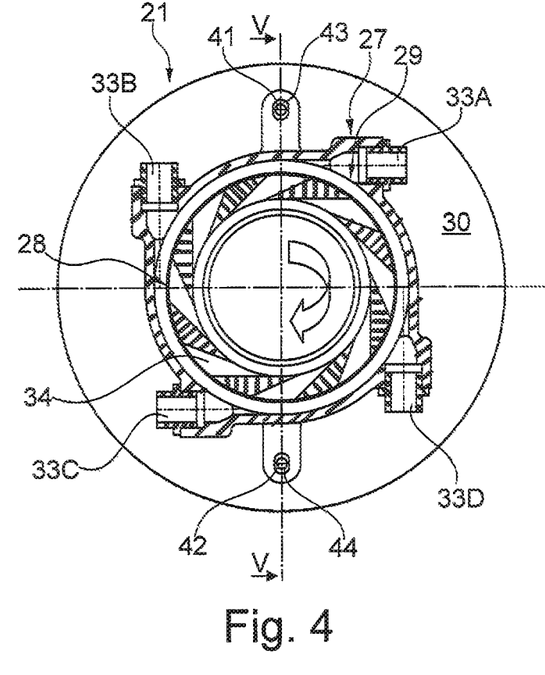
FIG. 4 shows a rendering of a second embodiment of the device according to the invention that is corresponding to FIG. 2.
Figure 5:
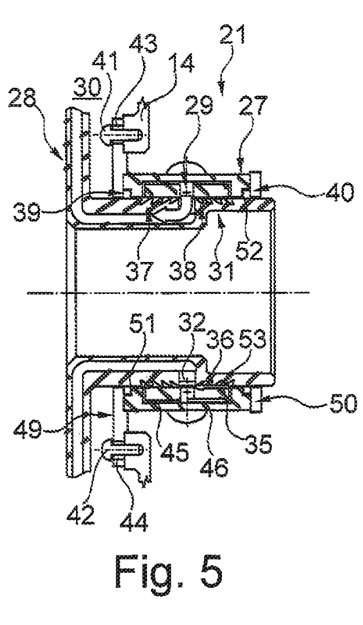
FIG. 5 shows a longitudinal section view of the device according to FIG. 4 along a sectional plane V-V that is more closely characterized in FIG. 4.

FIG. 4 and FIG. 5 show a second exemplary embodiment of the device 21, which substantially corresponds to the first embodiment of the device 21 shown in FIG. 2 and FIG. 3, which is why only the differences between the two embodiments of the device 21 are discussed in more detail in the following description, and it is referred to the above description pertaining to FIG. 2 and FIG. 3 as far as the further functionality of the device 21 according to FIG. 4 and FIG. 5 is concerned.

In the device 21 according to FIG. 4 and FIG. 5, the thread areas 37 and 38 are arranged in the area of the surface 35 of the second structural component 28 in order to seal off the transition area 32 of the interface 29 against the environment 30 of the structural components 27 and 28 to the previously described degree, while the recirculation areas 45 and 46 are provided so as to extend in the area of the first structural component 27 to the degree as it has been described more closely in the above description.

Figure 6:
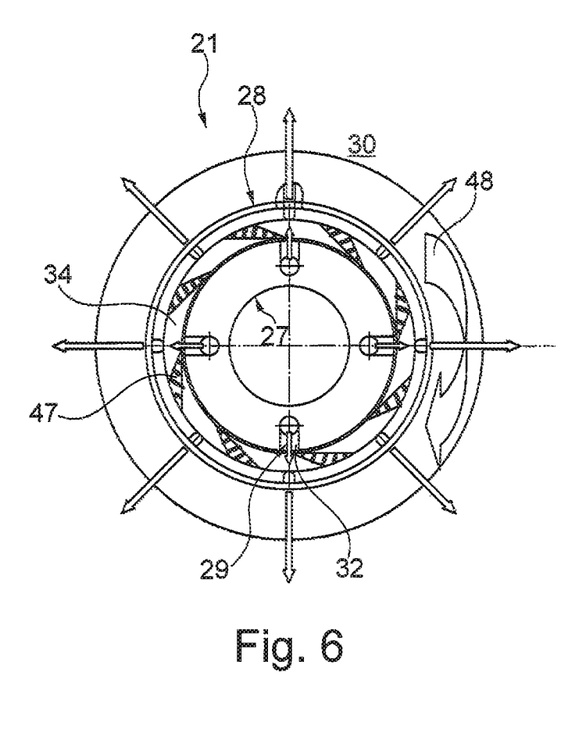
FIG. 6 shows a rendering of a third embodiment of the device according to the invention that is corresponding to FIG. 2.
Figure 7:
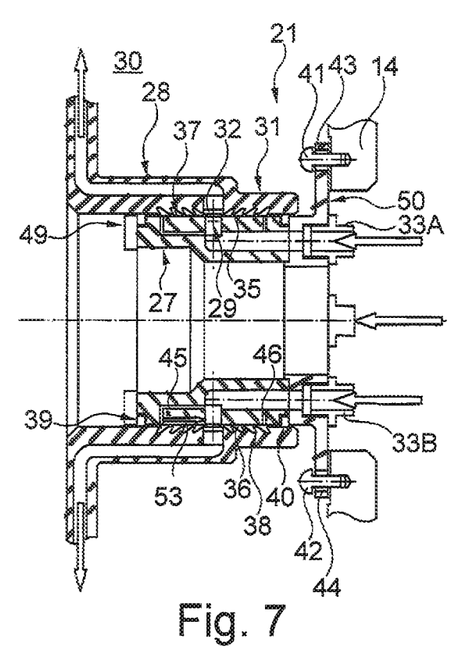
FIG. 7 shows a longitudinal section view of the device according to FIG. 6 along a sectional plane VII-VII that is more closely characterized in FIG. 6.

A third exemplary embodiment of the device 21 is shown in FIG. 6 and FIG. 7, with its principle of operation basically corresponding to the principle of operation of the device 21 which has been explained in connection with FIG. 2 and FIG. 3. In the embodiment of the device 21 according to FIG. 6 and FIG. 7, the first structural component 27 is arranged radially inside the second structural component 28, whereby the hydraulic fluid that is supplied to the interface 29 via the supply areas 33A to 33D is guided via the interface 29 from the inside radially outward to the transmission areas 34 of the second structural component 28. Just as in the second embodiment of the device 21 according to FIG. 4 and FIG. 5, the thread areas 37 and 38 are again provided in the area of the second structural component 28, and can also be arranged in the area of the structural component 27 to the same extent as has been described in connection to FIG. 2 and FIG. 3.

PARTS LIST 1 aircraft engine
2 fan device
3 compressor shaft
3A to 3C area of the compressor shaft
4 epicyclic gear
5 fan shaft
6 planet web, planetary carrier
7 planetary wheel
7A, B tooth area of the planetary wheel
8 bearing device
9 spherical bearing unit
10 further bearing unit
11 hollow wheel
11A, B tooth area of the hollow wheel
12 sun gear 12A, B tooth area of the sun gear
13 flexible connection device
14 housing
15 U-shaped area of the flexible connection device
16 finger-like area of the planet web
17 inner bearing element
18 bolt element
19 spherical coupling element
20 spring ring
21 device
22 lubricating and cooling oil line
23 further conduit
24 additional conduit
25, 26 flange area
27 first structural component
28 second structural component
29 interface
30 environment
21 sealing device
32 transition area
33A to 33D supply area
34 transmission area
35 surface of the second structural component
36 surface of the first structural component
37, 38 thread area
39, 40 further sealing device
41, 42 bolt element
43, 44 slotted hole
45, 46 recirculation area
47 blade area
48 rotational direction
49, 50 disc element
51, 52 groove
53 flow direction
54, 55 bearing unit

The invention claimed is:

1. A device comprising:
a fixed first structural component including a supply area for hydraulic fluid;
a second structural component that is connected at least in certain areas in a rotatable manner to the first structural component, the second structural component including a rotational axis and a transmission area for the hydraulic fluid,
an interface between the first structural component and the second structural component,
wherein the hydraulic fluid is guided to lubrication points via the first structural component and the second structural component,
wherein the second structural component includes a blade area extending in a radial direction inside the second structural component and including an input portion, an output portion and a plurality of blades positioned around a circumference of the second structural component, the plurality of blades extending between the input portion and the output portion at a defined angle with respect to the radial direction and forming a plurality of transmission areas between the plurality of blades, the blades shaped to continuously decrease flow cross-sections of the transmission areas in flow directions of the hydraulic fluid from the input portion to the output portion;
wherein the first structural component is arranged inside the second structural component and the hydraulic fluid is guided via the first structural component and the interface radially from the inside to an outside into the second structural component.

2. The device according to claim 1, wherein the hydraulic fluid is guided in the radial direction through the transmission areas against a rotational direction of the second structural component.

3. The device according to claim 1, and further comprising a sealing device sealing the interface against an environment of the first and second structural components, the interface comprising a transition area that is limited by areas of the first and second structural components which are overlapping in the radial direction and which carry the hydraulic fluid during operation, the transition area being connected to the supply area and to the transmission areas.

4. The device according to claim 3, wherein the interface forms an area of a floating hydrodynamic bearing that carries the hydraulic fluid between the first and second structural components.

5. The device according to claim 3, wherein the sealing device includes at least one thread area in an area of a surface of at least one chosen from the first structural component and the second structural component that faces a surface of the other of the at least one chosen from the first structural component and the second structural component.

6. The device according to claim 5, and further comprising a recirculation area positioned adjacent the at least one thread area, the recirculation area leading to the interface and connecting the interface to an area of the at least one thread area that faces away from the interface.

7. The device according to claim 6, wherein the recirculation area includes at least one chosen from a channel and a bore in at least one chosen from the first structural component and the second structural component.

8. The device according to claim 5, wherein a pitch and a height of a turn of a thread of the at least one thread area increases with growing distance from the interface.

9. The device according to claim 5, wherein the at least one thread area includes two thread areas and the transition area is arranged in an axial extension of the first and second structural components between the two thread areas.

10. The device according to claim 5, wherein the at least one thread area comprises a multi-start thread.

11. The device according to claim 1, and further comprising bolt elements positioned in slotted holes for supporting and fixing the first structural component.

12. The device according to claim 3, wherein the supply area includes a plurality of oil supply areas arranged in a symmetrically distributed manner over a circumference of the first structural component.

13. The device according to claim 5, and further comprising a further sealing device including a seal ring, provided on a side of the at least one thread area that faces away from the interface.

* * * * *